US008394462B2

(12) United States Patent
Tevis et al.

(10) Patent No.: US 8,394,462 B2
(45) Date of Patent: Mar. 12, 2013

(54) METHODS FOR APPLYING COATING COMPOSITIONS TO AN ARTICLE AND ARTICLES PRODUCED THEREOF

(75) Inventors: Mark C. Tevis, Dawsonville, GA (US); Ken Downing, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 1968 days.

(21) Appl. No.: 10/528,220

(22) PCT Filed: Oct. 6, 2003

(86) PCT No.: PCT/US03/31604

§ 371 (c)(1), (2), (4) Date: Mar. 18, 2005

(87) PCT Pub. No.: WO2004/033222

PCT Pub. Date: Apr. 22, 2004

(65) Prior Publication Data

US 2006/0165997 A1 Jul. 27, 2006

Related U.S. Application Data

(60) Provisional application No. 60/416,999, filed on Oct. 8, 2002.

(51) Int. Cl.
*C08F 2/46* (2006.01)
*C08F 2/48* (2006.01)

(52) U.S. Cl. ..................... 427/487; 427/372.2; 427/379; 427/385.5; 427/407.1; 427/428.01; 427/496; 427/508; 427/511

(58) Field of Classification Search ............... 427/372.2, 427/379, 385.5, 402, 407.1, 428.01, 487, 427/496, 508, 511
See application file for complete search history.

(56) References Cited

U.S. PATENT DOCUMENTS

| | | | | |
|---|---|---|---|---|
| 4,303,696 | A * | 12/1981 | Brack | 427/503 |
| 5,282,917 | A * | 2/1994 | Danelski | 156/277 |
| 5,401,541 | A | 3/1995 | Hodnett, III | |
| 5,417,164 | A * | 5/1995 | Nishida et al. | 101/453 |
| 5,573,831 | A * | 11/1996 | Suzuki et al. | 428/64.1 |
| 5,698,284 | A * | 12/1997 | Kubota et al. | 428/64.7 |
| 5,795,642 | A * | 8/1998 | Ishikawa et al. | 428/141 |
| 6,379,742 | B1 | 4/2002 | Behm et al. | |
| 6,472,026 | B1 * | 10/2002 | Maag et al. | 427/492 |
| 6,688,976 | B1 * | 2/2004 | Tulley et al. | 463/17 |
| 6,835,420 | B1 * | 12/2004 | Rockrath et al. | 427/407.1 |
| 6,899,752 | B2 * | 5/2005 | Sekioka et al. | 106/31.32 |

FOREIGN PATENT DOCUMENTS

| | | |
|---|---|---|
| CA | 2406991 | 11/2001 |
| EP | 0914875 | 5/1999 |

(Continued)

OTHER PUBLICATIONS

International Search Report from WO2004/033222 dated Sep. 23, 2004.

*Primary Examiner* — Elena T Lightfoot
(74) *Attorney, Agent, or Firm* — Dority & Manning, P.A.

(57) ABSTRACT

Described herein are methods for applying multiple layers of a composition to an article. Also presented are articles produced by the methods described herein. The methods include applying a first composition to the outer surface of a game card to produce a first layer, applying a second composition to the outer surface of the first layer to produce a second layer, applying an ink to the outer surface of the first layer, or the outer surface of the second layer, or both, so as to form an image, and applying a third composition to the outer surface of the second layer to produce a third layer.

15 Claims, 1 Drawing Sheet

FOREIGN PATENT DOCUMENTS

| | | | | |
|---|---|---|---|---|
| EP | 0983801 | | | 3/2000 |
| EP | 1149712 | | | 10/2001 |
| GB | 642892 | | | 9/1950 |
| JP | 2002067483 | A | * | 3/2002 |

* cited by examiner

METHODS FOR APPLYING COATING COMPOSITIONS TO AN ARTICLE AND ARTICLES PRODUCED THEREOF

CROSS-REFERENCE TO RELATED APPLICATION

This application claims the benefit of U.S. Provisional Patent Application Ser. No. 60/416,999, filed on Oct. 8, 2002. This provisional patent application is herein incorporated by this reference is its entirety for all of its teachings.

SUMMARY OF THE INVENTION

Described herein are methods for applying multiple layers of a composition to an article. Also presented are articles produced by the methods described herein.

It is desirable to be able to produce an article having multiple layers in an efficient manner during manufacturing. It is also desirable to produce articles that have improved mechanical properties and improved security features, such as graphic adhesion, improved backside wick protection and improved resistance to image ink alteration and migration. The methods described herein satisfy this current need in the art.

Additional advantages of the invention will be set forth in part in the description that follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The methods and articles described herein can be understood more readily by reference to the following detailed description of preferred aspects and the Examples included herein.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a carrier" includes mixtures of two or more such carriers, and the like.

Ranges are often expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

A weight part of a component, unless specifically stated to the contrary, is based on the weight or mass of one component relative to the weight or mass of a second component. The weight or mass can be expressed in grams, pounds, or any other acceptable unit of mass. Percentages of components are expressed as percent of the total formula weight.

Throughout this publication, where publications are referenced, the disclosures of these publications in their entireties are hereby incorporated by reference into this application in order to more fully describe the state of the art to which this invention pertains.

Figure 1:
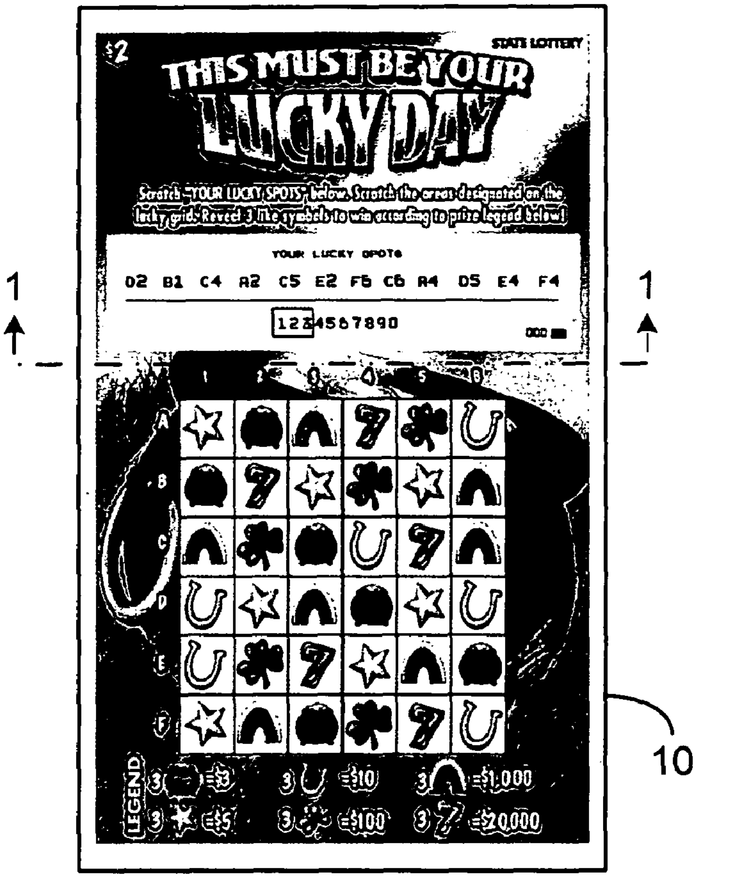
FIG. 1 is a lottery ticket with a multilayer coating composition on its outer surface.
Figure 2:
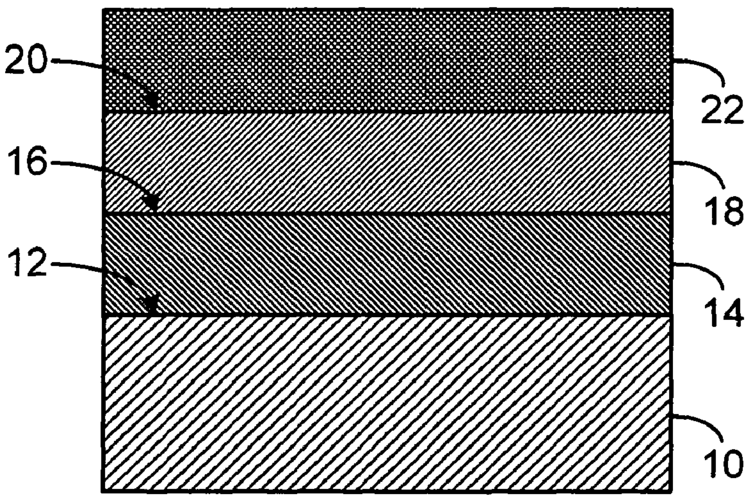
FIG. 2 is a cross-section along Line 1-1 of the lottery ticket of FIG. 1.

Described herein are methods for applying multiple layers of a coating composition on the outer surface of an article. An example of such an article is the lottery ticket 10 illustrated in FIG. 1. As shown from the cross-section along Line 1-1 of the lottery ticket 10, in one aspect, the method involves (a) applying a first composition comprising a first oligomer comprising an energy-curable oligomer to the outer surface 12 of the article (lottery ticket 10) to produce a first layer 14, wherein after the application step (a), a first layer 14 comprising the first oligomer is on the outer surface 12 of the article, and wherein the first layer 14 has an outer surface 16;

(b) drying the article produced after step (a);

(c) applying a second composition comprising a second oligomer comprising an energy-curable oligomer to the outer surface 16 of the first layer 14 to produce a second layer 18, wherein after the application step (b), the second layer 18 is on the outer surface 16 of the first layer 14, and wherein the second layer 18 has an outer surface 20;

(d) drying the article produced after step (c);

(e) applying a third composition comprising a third oligomer comprising an energy-curable oligomer to the outer surface 20 of the second layer 18 to produce a third layer 22, wherein after the application step (d), the third layer 22 is on the outer surface 20 of the second layer 18; and (f) curing the first oligomer, the second oligomer, and the third oligomer.

The first, second and third compositions comprise one or more energy-curable oligomers. The term "oligomer" referred to herein is defined as a substance composed of oligomer molecules. An "oligomer molecule" is defined herein as a molecule of intermediate relative molecular mass, the structure of which is composed of a small plurality of units derived, actually or conceptually, from molecules of lower relative molecular mass. A molecule is regarded as having an intermediate relative molecular mass if it has properties which do vary significantly with the removal of one or a few of the units. If a part or the whole of the molecule has an intermediate relative molecular mass and essentially comprises a small plurality of units derived, actually or conceptually, from molecules of lower relative molecular mass, it can be described as oligomeric, or by oligomer used adjectively.

The term "energy-curable" refers to a compound that can cross-link or react with another compound when exposed to energy in the form of UV light or energy from an electron beam. Generally, energy-curable compounds contain one or more unsaturated groups including, but not limited to, carbon-carbon double and triple bonds as well as ring systems. The energy-curable compounds useful in the methods described herein can cross-link or react with one another by free radical chemistry or cationic chemistry using techniques known in the art.

In one aspect, the first, second and/or third oligomer is water based. In another aspect, the third oligomer is not water based. The term "water-based," which is also referred to as "water-dilutable," refers to compounds that are miscible or dispersible in water. For example, a water-based oligomer can be part of a composition containing 10% to 50% water and still maintain its integrity. Alternatively, the water-based oligomers used herein in this aspect can be diluted with water and the oligomer still maintains its integrity.

In one aspect, the first oligomer, the second oligomer, and the third oligomer are (1) a polyester or urethane having an acrylate group or (2) a cycloaliphatic diepoxide. Examples of first, second and third oligomers useful herein include, but are not limited to, an epoxy acrylate, a urethane acrylate, a polyester acrylate, an acrylated acrylic, or a cycloaliphatic diepoxide. Specific examples of first oligomer and second oligomer include, but are not limited to, LUX 241, LUX 101, LUX 121, and LUX 399 from Alberdingk-Boley, Inc. and Ucecoat 7770 and Ucecoat 7772 from UCB Chemical. In another aspect, the first and second oligomer has a glass transition temperature of about 50° C. to about 110° C., and the third oligomer has a glass transition temperature of about −30° C. to about 60° C.

In one aspect, the first oligomer, the second oligomer, and the third oligomer are different compounds. In another aspect, the first oligomer and the second oligomer are the same compound. In a further aspect, the first oligomer and the third oligomer are the same compound. In another aspect, the second oligomer and the third oligomer are the same compound. In another aspect, the first composition comprises two or more different first oligomers. Similarly, the second and third compositions can also comprise two or more different second or third oligomers, respectively.

In one aspect, the amount of first oligomer and second oligomer present in the first composition and second composition, respectively, is from 10% to 40%, 15% to 40%, 15% to 35%, 18% to 35% or 20% to 35% by weight of the composition. In another aspect, the amount of third oligomer present in the third composition is from 15% to 50%, 15% to 40%, 15% to 35%, 15% to 30%, 20% to 50%, 20% to 45% or 20% to 40% by weight of the composition.

The first, second and third compositions can optionally contain other components including, but not limited to, a surfactant, a thickener, an absorbent, a pigment or dye, which are commonly used in the art. In another aspect, the third composition also comprises a slip additive, a release additive, or wax. The first, second and third composition can also contain water or a low boiling organic solvent. Examples of low boiling organic solvents include, but are not limited to, alcohols such as ethyl alcohol, normal propyl alcohol, isopropyl alcohol, or butyl alcohol, esters and ketones.

In one aspect, the first composition comprises water, a surfactant, a thickener, a pigment or dye, preferably a black pigment, and a first oligomer comprising a water-based, energy-curable oligomer. In another aspect, the second composition comprises water, a surfactant, a thickener, an absorbent, a pigment or dye, and a second oligomer comprising a water-based, energy-curable oligomer. In another aspect, the third composition comprises a surfactant, a slip additive, a wax and a third oligomer comprising an energy-curable oligomer.

The methods described herein contemplate applying the first, second and third compositions to an article. The term "applying" with respect to any of the compositions described herein refers to any technique known in the art for placing a coating on a substrate. Examples of techniques useful for applying any of the compositions described herein on the article include, but are not limited to, flexography, roto gravure, screen printing, offset, letter press or roll coater. In one aspect, the compositions described herein are applied to the article by flexography.

The term "outer surface" with respect to the article includes the portion of the article that is exposed to air and visible. The term "outer surface" also includes a section of the article that resides just below the exposed, visible surface of the article. For example, when the first composition is applied to the outer surface of the article, some of the first composition can be absorbed by the article so that some of the first composition is below the exposed, visible surface of the article.

The term "outer surface" with respect to the different layers produced by the compositions described herein also refers to the part of the layer produced by the first, second or third composition that is exposed to air and visible as well as the section of the layer below the exposed, visible surface that can absorb any components of the composition. In certain aspects, it is possible that adjacent layers can diffuse into each other. When two layers diffuse into one another at the interface upon curing, this is referred to in the art as "tying together." When two layers diffuse into one another at the interface upon drying, this is referred to in the art as "commingling" or "intermingling."

The thickness of each layer that is applied to the article can vary produced by the methods described herein is from 0.1 mil to 0.7 mil, 0.1 mil to 0.6 mil, depending upon the technique that is used to apply the composition as well as the end-use of the article. In one aspect, the wet thickness of any layer is from 1 mil to 0.5 mil, 0.1 mil to 0.4 mil or 0.1 mil to 0.3 mil, and preferably 0.3 layer. In another aspect, the first composition has a coating weight of 1.0# to 4# per thousand square feet, the second composition has a coating weight of 1.5# to 5# per thousand square feet, and the third composition has a coating weight of 1.0# to 4# per thousand square feet.

The methods described herein also contemplate applying two or more different first compositions or second compositions to the outer surface 12 of the article. For example, a first composition can be applied to the outer surface 12 of the article. Once this composition is applied to the article, this composition will produce a first layer 14 of first oligomer having an outer surface 16. A second first composition can then be applied to the outer surface 16 of the first composition to produce a second first layer (similar to second layer 18). Depending upon the application, several layers of first and second oligomer can be applied to the article.

The methods described herein involve performing a drying step (1) after the first composition is applied to the article and (2) after the second composition is applied to the outer surface 12 of the first layer 14. The drying steps (b) and (d) generally involve drying the first 14 and second 18 layers so that these layers are dry to the touch. In one aspect, drying steps (b) and (d) are performed by exposing the article with the first layer 14 or second layer 18 to a gas fired or electrically fired dryer coupled with a large flow of air volume. In one aspect, the temperature of the drying steps is from 230° F. to 390° F. The source of the large volume of air flow can be any blower known in the art. In one aspect, the blower can be a separate mechanical device or it can be part of a forced air dryer. Alternatively, the drying step can be performed by an IR dryer with no large volume of air flow.

In another aspect, the drying steps (b) and (d) can also encompass partial curing of the first and/or second oligomers. In one aspect, when no water is present in the first and second compositions, the first and second oligomers present in the first and second layers can be partially cured during the drying step by exposing the first and second oligomers to a UV lamp. In one aspect, when the first and/or second oligomer is a cycloaliphatic diepoxide, drying steps (b) and/or (d) is (are) performed by exposing the first and/or second oligomers to a UV lamp.

Not wishing to be bound by theory, it is believed that when drying steps (b) and (d) involve thermal heating in the presence of a large volume of air flow, the first oligomer and second oligomer do not react or cross-link with one another even though some of the first oligomer can diffuse into the second layer and vice versa (i.e., commingle or intermingle). Alternatively, when drying steps (b) and (d) involve exposing the first 14 and second 18 layers to light (e.g., a UV lamp), the first and second oligomers partially react or cross-link (i.e., tie together). When the first 14 and second 18 layers are commingled, intermingled and/or tied together, it is believed that the resultant article will have improved graphic adhesion, improved backside wick protection and improved resistance to image ink alteration or image ink migration by thermal or chemical means, once the layers are cured. Additionally, after drying steps (b) and (d) are performed, the first 14 and second 18 layers on the article are capable of passing through the press before being cured without tracking or picking, which is another advantage of the methods described herein.

After drying step (d), the third composition is applied to the outer surface 20 of the second layer 18 to produce a third layer 22. After the formation of the third layer 22, the first 14, second 18, and third 22 layers are cured in order to cross-link the first, second and/or third oligomers. The amount of cross-linking amongst the oligomers will vary depending upon the type of oligomer and the mode of curing. In one aspect, the curing step (f) is performed by using a UV lamp. For example, a "D" bulb can be used to cure the first oligomer present in the first layer, and a "D," "H," or "V" bulb can be used to cure the second oligomer in the second layer. In another aspect, the first 14, second 18 and third 22 layers can be cured by exposing the layers to an electron beam. In this aspect, the first, second and third oligomers cross-link with one another. The amount of cross-linking between the different oligomers will depend upon the type of first, second and third oligomer and the amount of commingling, intermingling or tying together that occurs between the different oligomers in the first 14, second 18 and third layers 22.

In another aspect, an image ink can be applied to the article. In one aspect, the image ink can be applied to the outer surface of the first 14 and/or second layer 18 after the first 14 and second layer 18 have been dried in steps (b) and (d), respectively. In one aspect, the image ink is applied to the outer surface 20 of the second layer 18 after the second layer 18 has been dried in step (d) to produce an image comprised of alpha numeric indicia. Once the image ink has been applied to the outer surface 16,20 of the first 14 or second layer 18, the resultant image can be dried using the techniques described above and subsequent layers can be applied over the image. In one aspect, the image ink can be applied to the outer surface 16,20 of the first 14 or second layer 18 using any method of ink jet printing including, but not limited to, drop on demand or continuous ink jet. In one aspect, the image can occupy a portion of the first 14 or second layer 18. In this aspect, when a subsequent layer is applied over the image, the subsequent layer can be in contact with the image as well as the outer surface of the first 14 or second layer 18.

In one aspect, the image ink is water based or solvent based. In another aspect, the image ink is energy curable. When the image ink is energy curable, it can cross-link or react with the first, second or third oligomer upon cross-linking. The image ink can be most any color, and the color will be determined by the selection of the dye and/or pigment used to prepare the image ink. The image inks disclosed in U.S. Pat. Nos. 6,310,115 and 6,156,110, which are incorporated by reference in their entireties, are useful in the methods described herein.

In one aspect, the sumps containing the first, second and third compositions and the image ink can be maintained at a temperature of 80° F. to 110° F. to maintain proper viscosity and flow. In one aspect, the first and second compositions have a viscosity of 19 seconds to 55 seconds at #2 Zahn (at 80° F.) for a flexography application. In another aspect, the third composition have a viscosity range of 18 to 40 seconds at #2 Zahn (at 80° F.) for a flexography application. Other application methods would require other viscosity ranges that are readily determinable.

The methods described herein are useful in applying multiple layers of a coating composition to the outer surface of an article. Examples of articles that can be coated with the methods described herein include, but are not limited to, lottery tickets, phone cards and commercial games. In one aspect, when the article is a lottery ticket, the lottery ticket is composed of SBS board stock.

The methods described herein provide numerous advantages over prior art techniques. For example, when the methods described herein are used to coat a game ticket, the play data area is much whiter than the older ticket configuration. The backside wick test results are much improved. Additionally, no bleed detecting dye is necessary in the lower blocking layer because of the improved barrier properties. Overall, the ticket opacity is much improved.

The invention has been described in detail with particular reference to preferred aspects thereof, but it will be understood that variations and modifications can be affected without departing from the scope and spirit of the invention.

EXAMPLES

The following example is put forth so as to provide those of ordinary skill in the art with a complete disclosure and description of how the compositions, articles, and/or methods claimed herein are made and evaluated, and are intended to be purely exemplary and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. The term "line" refers to lines per inch. The term "BCM" is billion cubic microns, which represents the cell volume of the anilox roller and is a major determinant of the volume of composition that is applied to the card.

A twenty one unit flexo press with an ESI EZCure 1 electron beam unit running at 125 KV was used to coat game cards. A dosage of 2.5 MRAD was used to cure the three compositions all at once. A dosage of from 2.5 to 4.5 MRAD was acceptable, depending on the total thickness of the three compositions. When tested on the twenty-one unit flexo press, the following anilox configurations and volumes were acceptable;

1$^{st}$ composition 165 line anilox, 13 BCM volume
2$^{nd}$ composition 120 line anilox, 15 BCM volume
3$^{rd}$ composition 165 line anilox, 13 BCM volume The above configurations use only one "hit" (i.e., layer) of each composition.

When two "hits" of a composition were applied, the second hit had the following anilox configurations;

1$^{st}$ composition 200 line anilox, 10 BCM volume
2$^{nd}$ composition 165 line anilox, 13 BCM volume
3$^{rd}$ composition, only one hit of the 3$^{rd}$ composition was applied When two hits of a composition are applied to the card, the first hit contained a higher volume of composition when compared to the volume of the second hit.

What is claimed is:

1. A method for applying an image onto a game card, the method comprising the steps of:

(a) applying a first composition comprising a first oligomer comprising an energy-curable oligomer to the outer surface of the game card to produce a first layer, wherein after the application step (a), a first layer comprising the first oligomer is on the outer surface of the game card, and wherein the first layer has an outer surface;

(b) drying the game card produced after step (a);

(c) at least partially curing the first composition;

(d) applying a second composition comprising a second oligomer comprising an energy-curable oligomer to the outer surface of the first layer to produce a second layer, wherein after the application step (d), the second layer is on the outer surface of the first layer, and wherein the second layer has an outer surface;

(e) drying the game card produced after step (d);

(f) at least partially curing the second composition;

(g) applying a third composition comprising a third oligomer comprising an energy-curable oligomer to the outer surface of the second layer to produce a third layer, wherein after the application step (g), the third layer is on the outer surface of the second layer;

(h) curing the first oligomer, the second oligomer, and the third oligomer; and (i) applying an ink to the outer surface of the first layer, or the outer surface of the second layer, or to both, so as to form an image.

2. The method of claim 1, wherein the composition in steps (a), (d) and (g) is applied by flexography, roto gravure, screen printing, offset, letter press or roll coater.

3. The method of claim 1, wherein the first oligomer and second oligomer are water based.

4. The method of claim 1, wherein each of the first oligomer, the second oligomer and the third oligomer comprises an epoxy acrylate, a urethane acrylate, a polyester acrylate, an acrylated acrylic, a cycloaliphatic diepoxide or a combination thereof.

5. The method of claim 1, wherein each of the first oligomer, the second oligomer and the third oligomer comprises (1) a polyester or urethane having an acrylate group or (2) a cycloaliphatic diepoxide.

6. The method of claim 1, wherein each of the first oligomer and second oligomer is from 10% to 40% by weight of the first composition and second composition.

7. The method of claim 1, wherein the third oligomer is from 15% to 50% by weight of the third composition.

8. The method of claim 1, wherein the third oligomer is not water-based.

9. The method of claim 1, wherein the first composition comprises water, a surfactant, a thickener, a pigment or dye, and a first oligomer comprising a water-based, energy-curable oligomer.

10. The method of claim 1, wherein the second composition comprises water, a surfactant, a thickener, an absorbent, a pigment or dye, and a second oligomer comprising a water-based, energy-curable oligomer.

11. The method of claim 1, wherein the third composition comprises a surfactant, a slip additive, a release additive, a wax and a third oligomer comprising an energy-curable oligomer.

12. The method of claim 1, wherein the drying steps (b) and (e) are performed by a dryer at a temperature of from 230° F. to 390° F. in the presence of a large flow of air volume.

13. The method of claim 1, wherein the curing step (f) is performed by exposing the game card produced after step (g) to an electron beam or UV lamp.

14. The method of claim 1, wherein the ink is water-based.

15. A method for applying a coating composition to a lottery ticket having an outer surface, comprising (a) applying a first composition comprising a first oligomer comprising an energy-curable, water-based oligomer to the outer surface of the ticket to produce a first layer, wherein after the application step (a), a first layer comprising the first oligomer is on the outer surface of the ticket, and wherein the first layer has an outer surface;

(b) drying the ticket produced after step (a) at a temperature of from 230° F. to 390° F. in the presence of a large flow of air volume while also partially curing the first oligomer;

(c) applying a second composition comprising a second oligomer comprising an energy-curable, water-based oligomer to the outer surface of the first layer to produce a second layer, wherein after the application step (c), the second layer is on the outer surface of the first layer, and wherein the second layer has an outer surface;

(d) drying the ticket produced after step (c) at a temperature of from 230° F. to 390° F. in the presence of a large flow of air volume while also partially curing the second oligomer;

(e) applying an image ink to the outer surface of the second layer to produce an image;

(f) drying the ticket produced after step (e);

(g) applying a third composition comprising a third oligomer comprising energy-curable oligomer over the image and the outer surface of the second layer to produce a third layer; and (h) curing the first oligomer, the second oligomer, and the third oligomer with an electron beam, wherein the first oligomer, the second oligomer or the third oligomer comprises a polyester acrylate, urethane acrylate, an epoxy acrylate or a combination thereof.

* * * * *